US008311900B1

(12) United States Patent
Bates et al.

(10) Patent No.: US 8,311,900 B1
(45) Date of Patent: Nov. 13, 2012

(54) PROVIDING SEPARATE VIEWS FOR ITEMS

(75) Inventors: Amy Bates, Seattle, WA (US); Sean M. Scott, Sammamish, WA (US); Brent Allen Vincent, Seattle, WA (US); John P. Simons, Seattle, WA (US); Maren M. Costa, Seattle, WA (US); Douglas J. Gradt, Seattle, WA (US); Eva Manolis, Bellevue, WA (US); Gianna Lise Puerini, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 437 days.

(21) Appl. No.: 12/608,061

(22) Filed: Oct. 29, 2009

(51) Int. Cl.
*G06Q 30/00* (2012.01)
(52) U.S. Cl. ...................... 705/27.2; 705/27.1
(58) Field of Classification Search ............... 705/26.1, 705/27.1, 27.2
See application file for complete search history.

(56) References Cited

U.S. PATENT DOCUMENTS

| | | | | |
|---|---|---|---|---|
| 7,216,092 | B1 * | 5/2007 | Weber et al. | 705/26.5 |
| 7,428,501 | B2 * | 9/2008 | Dinwoodie | 705/26.3 |
| 8,121,902 | B1 * | 2/2012 | Desjardins et al. | 705/26.1 |
| 2006/0148528 | A1 * | 7/2006 | Jung et al. | 455/566 |
| 2008/0180391 | A1 * | 7/2008 | Auciello et al. | 345/156 |
| 2009/0248831 | A1 * | 10/2009 | Scott et al. | 709/217 |

OTHER PUBLICATIONS

Richards, K., et al., "Microsoft Publisher 1.0," PC-Computing, vol. 5, No. 5, p. 358, May 1992.*
Rosen, "WEST Search History for U.S. Appl. No. 10/831,503," May 20, 2008.*
Rosen, "Examiner's Affidavit for U.S. Appl. No. 12/608,061," signed Mar. 7, 2012.*

* cited by examiner

*Primary Examiner* — Nicholas D Rosen
(74) *Attorney, Agent, or Firm* — Thomas, Kayden, Horstemeyer & Risley, LLP (57) ABSTRACT

Disclosed are various embodiments for providing separate views for items. A network page providing a summary view of at least a portion of a pool of items is encoded in a computing resource for rendering by a client computing device. A window superimposed over at least a portion of the summary view is rendered by the client computing device. The window provides a separate view for examination of one item from the pool of items, and the window facilitates a serial examination of the pool of items.

26 Claims, 10 Drawing Sheets

PROVIDING SEPARATE VIEWS FOR ITEMS

BACKGROUND

Online retailers often offer thousands of items for ordering or purchasing within an online catalog. Users typically browse such items though an item search engine or through indexes of the items within a taxonomy. In either case, the users may be presented with a list of items, which may show only abbreviated information about each item due to screen space limitations.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Disclosed herein are various embodiments relating to providing separate views for items. Items may include, for example, products, services, advertisements, network pages, social networking profiles, blog postings, digital content items, and/or other items. When a user accesses a network site of an online retailer, for example, the user may seek to search or browse for items offered by the online retailer. In order to search or browse for items, the user may specify a search query for an item search engine, select a category link from a menu or taxonomy of items, and/or merely access a network page of the network site. Consequently, a list of items is rendered within a network page.

Typically, the list of items is provided in a summary format in order to describe a greater number of items within a single network page. The summary format may include, for example, a title, a price, an image, a link to order the item, a link for more information about the item, and/or other descriptive elements for the items. When the number of items exceeds a number that may be described within a single network page, the list of items may be paginated across multiple network pages.

Clicking on a link or button to bring up a detail network page for an item may be inconvenient for the user. Such a detail network page may replace the network page having the list of items within the browser, which may annoy users who want to return to the list of items after viewing the detail network page. In some cases, the detail network page may be rendered within a separate browser window that must be closed, minimized, or otherwise switched from, in order to view another item in the list of items.

The various embodiments herein provide for a separate, intermediate view between the summary view of the list of items and the detail network page for the item. Such a separate view may provide additional information about the item not presented within the summary view containing the list of items. The various embodiments herein facilitate the serial examination of the items from the list of items within the separate view, which may be rendered, for example, as a pop-over window. In the following discussion, a general description of the system and its components is provided, followed by a discussion of the operation of the same.

Figure 1:
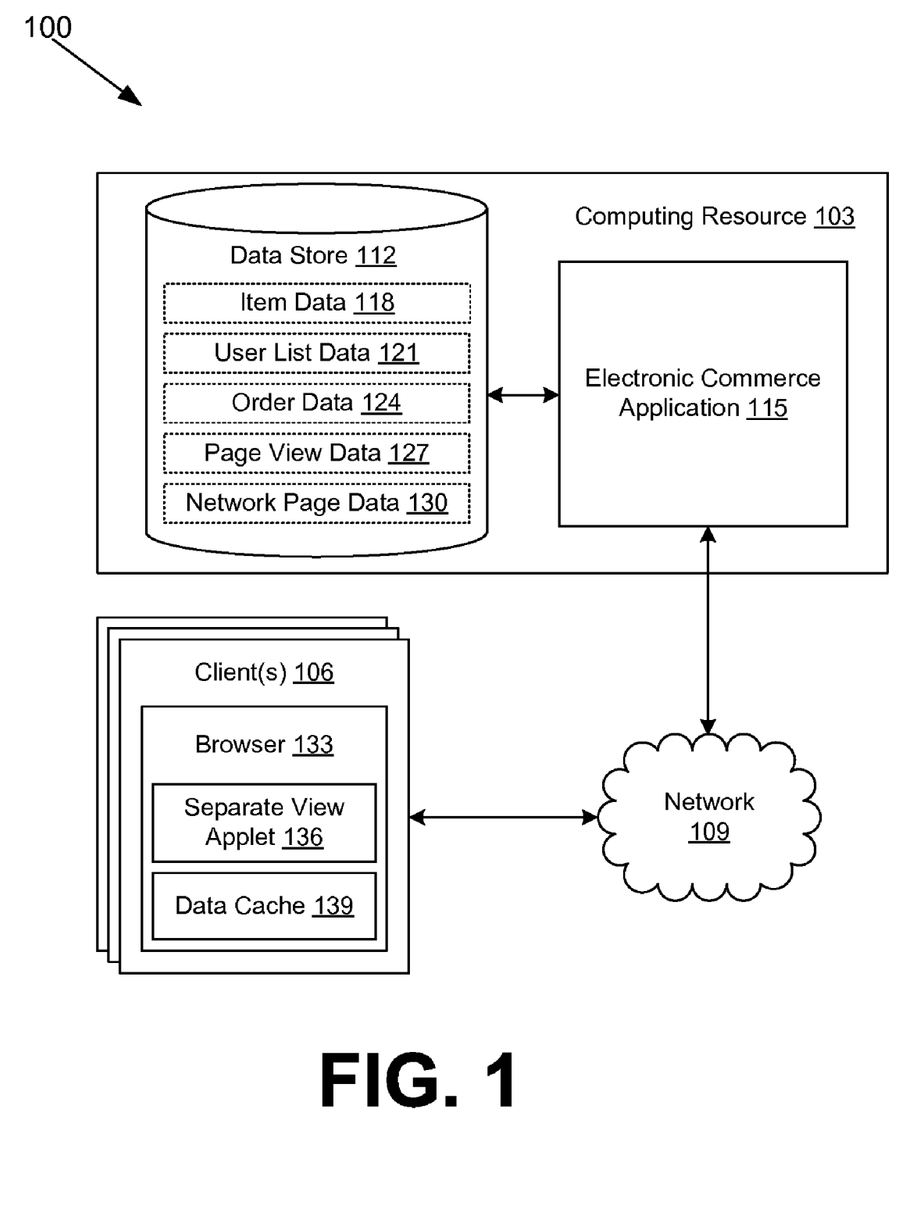
FIG. 1 is a drawing of networked environment according to various embodiments of the present disclosure.

With reference to FIG. 1, shown is a networked environment 100 according to various embodiments. The networked environment 100 includes a computing resource 103 in data communication with one or more clients 106 via a network 109. The network 109 includes, for example, the Internet, intranets, extranets, wide area networks (WANs), local area networks (LANs), wired networks, wireless networks, or other suitable networks, etc., or any combination of two or more such networks.

The computing resource 103 may comprise, for example, a server computer or any other computing device or system providing computing resources. The computing resource 103 may represent multiple computer systems arranged, for example, in one or more server banks or other arrangements. To this end, the computing resource 103 may comprise, for example, a cloud computing resource, a grid computing resource, and/or any other distributed computing arrangement. Such computer systems may be located in a single installation or may be dispersed among many different geographical locations. In one embodiment, the computing resource 103 represents a virtualized computer system executing on one or more physical computing systems. For purposes of convenience, the computing resource 103 is referred to herein in the singular. However, in one embodiment, the computing resource 103 represents a plurality of computer systems arranged as described above.

Various applications and/or other functionality may be executed in the computing resource 103 according to various embodiments. Also, various data is stored in a data store 112 that is accessible to the computing resource 103. The data store 112 may be representative of a plurality of data stores as can be appreciated. The data stored in the data store 112, for example, is associated with the operation of the various applications and/or functional entities described below.

The components executed on the computing resource 103 may include, for example, an electronic commerce application 115, and other applications, services, processes, systems, engines, or functionality not discussed in detail herein. The electronic commerce application 115 is executed to serve up network pages, such as web pages, that are encoded for rendering on clients 106. In particular, the electronic commerce application 115 may facilitate browsing or searching on a network site that provides information about items and/or offers items for order. In various embodiments, the electronic commerce application 115 may include an item search engine, an item taxonomy, a network page server (e.g., a hypertext transfer protocol (HTTP) server), and/or other components. The electronic commerce application 115 may provide shopping cart functionality and/or other functionality related to electronic commerce.

The data stored in the data store 112 includes, for example, item data 118, user list data 121, order data 124, page view data 127, network page data 130, and potentially other data. Item data 118 may include, for example, item titles, item images, item descriptions, item prices, item quantities, item reviews, item categories, item manufacturer, item technical information, item sizes, item colors, item options, similar items, and/or any other data that may be used to describe or otherwise relate to items. The items described in item data 118 may be referred to as a catalog of items associated with the given network site. User list data 121 may include data relating to lists of items associated with users. Such users may be registered users with a formal account or may merely be visitors. Such lists of items in user list data 121 may include shopping cart lists used in placing orders, gift lists, wish lists, and/or any other lists for users to track one or more items.

Order data 124 may include data describing customer orders of items. Such order data 124 may include quantities of items and other figures extracted from an aggregation of orders, and/or may include other details from the orders themselves. Page view data 127 describes a quantity of page views associated with network pages that describe particular items. Page view data 127 may be used, for example, to define the relationships among items according to views of network pages. Such network pages may include, for example, detail network page views for items, category network pages including the items, and/or any other network pages that can be associated with particular items. In some embodiments, page view data 127 may include statistics generated from network page server log data that directly indicate the number of page views associated with each respective item. In other embodiments, page view data 127 may include the actual log data generated by the electronic commerce application 115.

Network page data 130 may include any data relating to network pages served up by the electronic commerce application 115. To this end, network page data 130 may include static network pages or static elements of network pages, for example, in hypertext markup language (HTML), extensible markup language (XML), and/or any other language suitable for creating network pages. Further, network page data 130 may include code that generates dynamic network pages when executed or interpreted in the computing resource 103. Such code may be written in any suitable programming language, such as PHP, Perl, Objective C, Java, Ruby, etc. Network page data 130 may also include code configured to be executed or interpreted within a client 106 in order to render a dynamic network page. Such code may be referred to as applets and may be written in any suitable programming language, such as Java Script, Java, etc.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 106 may be configured to execute various applications such as a browser 133 and/or other applications. The browser 133 may be executed in a client 106, for example, to access and render network pages, such as web pages, or other network content served up by the computing resource 103 and/or other servers. The browser 133 may include a separate view applet 136 obtained from the electronic commerce application 115, which may comprise any client-side code to be interpreted or executed within the browser 133 on the client 106 in order to render a separate view for items. The separate view applet 136 may include dynamic HTML (DHTML), Java Script, Java, Ajax, ActiveX, and/or any other client-side code.

The browser 133 may include a data cache 139 to store data obtained from the electronic commerce application 115 and/or other sources. The data stored within data cache 139 may speed rendering or re-rendering of network pages by the browser 133 so that it may not be necessary to re-obtain data that has already been downloaded to the client 106. The client 106 may be configured to execute applications beyond browser 133 such as, for example, email applications, instant message applications, and/or other applications.

Next, a general description of the operation of the various components of the networked environment 100 is provided. To begin, a user at a client 106 accesses a network page on a network site from the electronic commerce application 115 over the network 109. Through this initial access, or through a subsequent access, the client 106 may provide item selection criteria to the electronic commerce application 115. Such item selection criteria may comprise keywords forming a search query, a selected node within a taxonomy of items, an item category, and/or any other type of item selection criteria.

In some embodiments, the user may provide no item selection criteria. As a non-limiting example, a user may merely access a home network page for the network site and provide no other input. Default item selection criteria may be used in such cases.

Accordingly, the electronic commerce application 115 generates a pool of items from a catalog of items described in item data 118. The items in the pool of items may be selected based, for example, upon whether the items are associated with a particular category, upon whether the items contain a search query term within the title, and/or upon any other method for selecting items from a catalog of items. In some embodiments, the pool of items may be predefined. The pool of items may be associated with a specific sequence of items. As non-limiting examples, the pool of items may be ranked, or sequenced, based on relevance to the selection criteria, sales, network page views, newest arrivals, and/or other factors. To this end, the electronic commerce application 115 may refer to page view data 127, order data 124, and/or other data in order to perform the ranking. In various embodiments, the ranking may associate each item of the pool of items with a priority, or score.

After the pool of items is generated, the electronic commerce application 115 encodes one or more network pages for rendering in the browser 133 executing on a client 106. These network page(s) provide a summary view of the pool of items. Such a summary view may include, for example, item titles, item prices, representative item images, and/or other information. Links and/or buttons may be provided to facilitate ordering of the items or to access other network pages providing more detailed information. In one embodiment, the encoding may be performed according to code stored within network page data 130. In one embodiment, the network page(s) may include a description of the entire pool of items, for example, in a document object model (DOM) format, or in some other format.

The pool of items in the summary view may be paginated as desired across multiple network pages to accommodate varying levels of detail. In one embodiment, the browser 133 provides information to the electronic commerce application 115 regarding screen resolution and/or window size for the browser 133, and the electronic commerce application 115 paginates the summary view according to this information. In another embodiment, the browser 133 performs the pagination of the summary view according to code embedded within the network page.

The network page(s) are then sent from the electronic commerce application 115 to the client 106 over the network 109. When the summary view is paginated across multiple network pages, in one embodiment, the browser 133 may be sent, or may request, only the data to be rendered within one of the network pages. In other embodiments, the browser 133 may be sent, or may request, data to be rendered in subsequent network pages in order to speed rendering. Such pre-fetched data may be stored within data cache 139.

Figure 2:
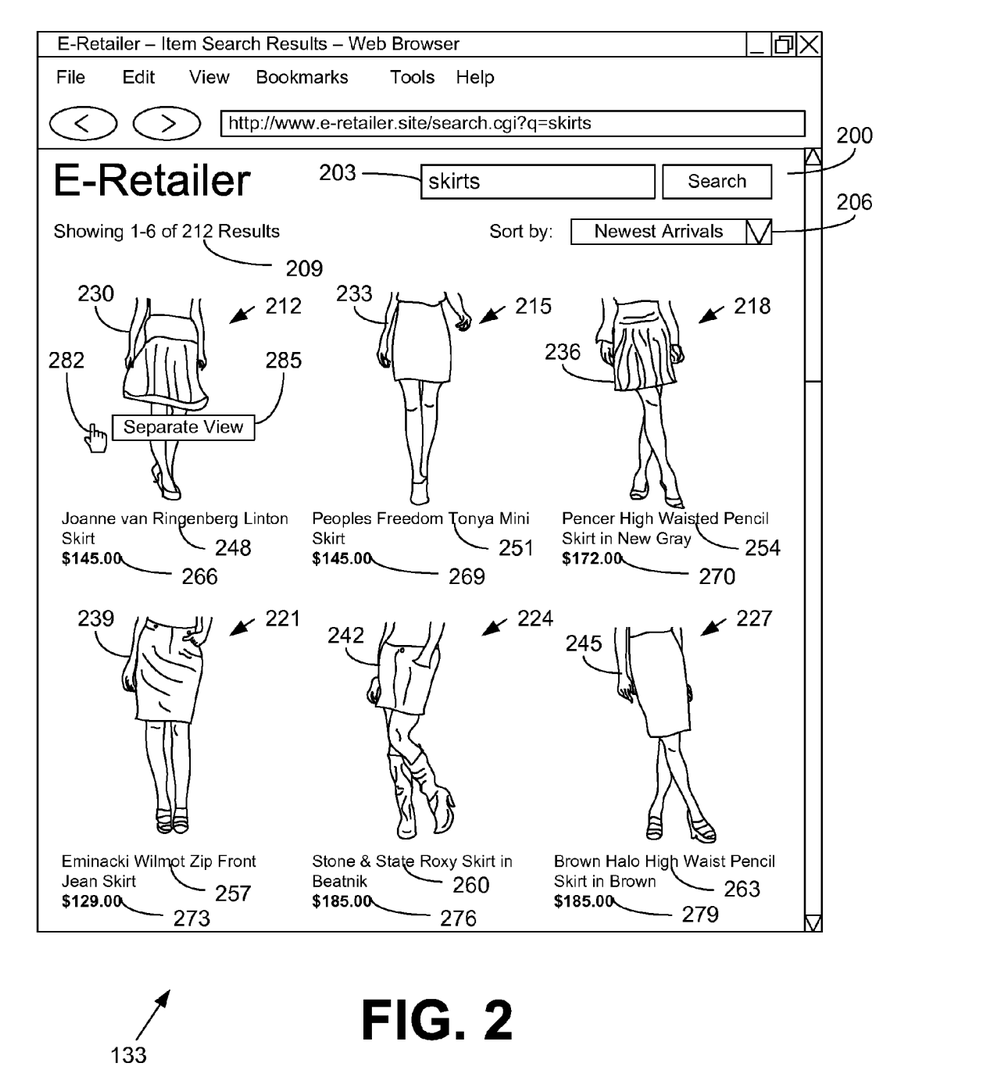
FIGS. 2-6 are drawings of examples of user interfaces rendered by a client in the networked environment of FIG. 1 according to various embodiments of the present disclosure.

Turning now to FIG. 2, shown is a drawing of an example of a user interface rendered by a client 106 (FIG. 1) in the networked environment 100 (FIG. 1) according to various embodiments of the present disclosure. In particular, FIG. 2 depicts an example of a summary view 200 rendered by the browser 133. The summary view 200 depicts a portion of a pool of items generated in response to an item search for the keyword "skirts." The keyword "skirts" is shown as entered within a selection criteria input field 203, though it is understood that a user may have arrived at the summary view 200 by clicking on a link or button on another network page that was configured for the keyword "skirts." Further, a user may have entered a uniform resource locator (URL) into the browser 133, where the URL is specifically associated with the item selection criteria.

The summary view 200 is shown with a ranking of "Newest Arrivals" in a ranking selection field 206. As non-limiting examples, other rankings may comprise "Best Selling," "Most Relevant," "Most Viewed," "Highest Rated," etc. Although depicted as a drop-box, it is understood that the ranking selection field 206 may comprise a text input field, a text area, a set of radio buttons, and/or any other input means. Further, in other embodiments, the ranking selection field 206 may be absent, with the ranking being performed automatically or according to a default ranking. In other embodiments, the ranking selection field 206 and the selection criteria input field 203 may be present within another network page but not within the summary view 200.

The summary view 200 may include a view description 209. As shown, the view description 209 reads "Showing 1-6 of 212 Results." This indicates that the pool of items comprises 212 items and that the summary view 200 is paginated so that the first six item results 212, 215, 218, 221, 224, 227 are listed according to a ranking of the pool of items are shown in this summary view 200. Although six item results 212, 215, 218, 221, 224, 227 are shown within the summary view 200, this number is not intended to be limiting. Some embodiments may employ no pagination or pagination that varies among summary views 200.

Each of the item results 212, 215, 218, 221, 224, 227 includes a respective item image 230, 233, 236, 239, 242, 245, a respective item title 248, 251, 254, 257, 260, 263, and a respective item price 266, 269, 270, 273, 276, 279. It is understood, however, that more or less information may be included for each item result 212, 215, 218, 221, 224, 227 in other embodiments. In various embodiments, the item title 248, 251, 254, 257, 260, 263 may comprise a link to access a network page with more detailed information about the item. Additionally, there may be links or buttons to order the item, and/or to add the item to a shopping cart or other list, etc.

As illustrated in the example of summary view 200, a cursor 282 has hovered over the item result 212 and a link 285 entitled "Separate View" has appeared. The link 285 may be configured to launch a separate view for the item result 212 within another window, such as a pop-over window or a portion of the screen including the summary view 200. In some embodiments, the link 285 may always be visible or may appear in response to a single click, double click, or other trigger. The link 285 may appear when hovering over the item image 230, the item title 248, the item price 266, and/or any element of the item result 212. The link 285 may comprise a hyperlink, a button, an image, and/or any other means for launching a separate view. In another embodiment, the separate view may be rendered automatically upon selecting or hovering over the item result 212 with no link 285.

Referring back to FIG. 1, when the electronic commerce application 115 generates the network page(s) including the summary view 200 (FIG. 2), the electronic commerce application 115 may also generate one or more network pages to implement a separate view of one or more items. In one embodiment, the network pages including the summary view 200 also implement the separate view. In another embodiment, the separate view is implemented through a different set of network pages that are sent separately across the network 109 to the client 106. In yet another embodiment, the network page(s) including the summary view 200 also include client-side code (i.e., the separate view applet 136) to allow the browser 133 to render the separate view when needed.

In various embodiments, data for rendering the separate view for an item may be pre-fetched, or otherwise pre-loaded, on the client 106. Alternatively, or additionally, data for rendering the separate view for an item may be downloaded from the electronic commerce application 115 on demand. The data communication between the separate view applet 136 and the electronic commerce application 115 may use Ajax, JavaScript, XML, and/or other interactive network page technologies.

Figure 3:
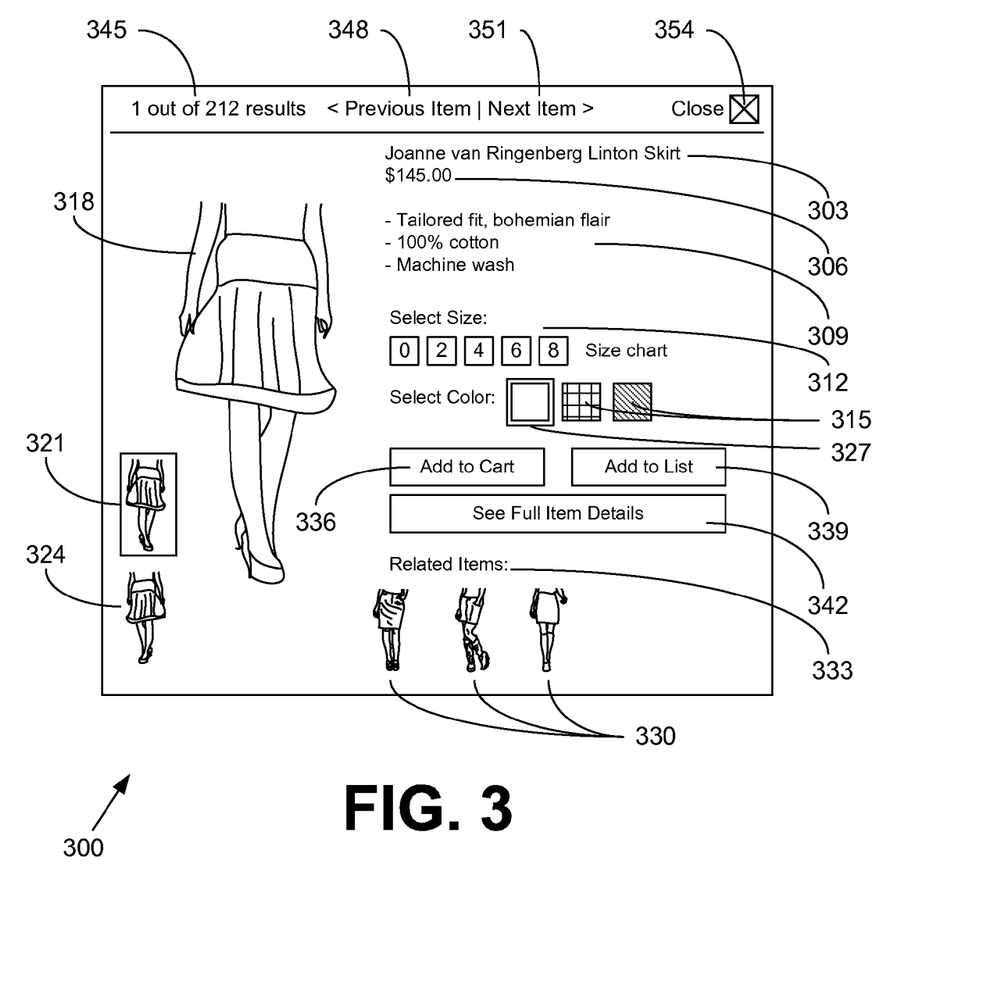

With reference now to FIG. 3, shown is a drawing of an example of a user interface rendered by a client 106 (FIG. 1) in the networked environment 100 (FIG. 1) according to various embodiments of the present disclosure. In particular, FIG. 3 depicts an example of a separate view 300 rendered by a browser 133 (FIG. 1) executing on the client 106. Further, the separate view 300 may be generated according to a separate view applet 136 (FIG. 1) executed by the browser 133. The separate view 300 may comprise, for example, a pop-over window, a pop-under window, a separate window of the browser 133, a logical window comprising a portion of a primary window of the browser 133, etc. In various embodiments, the rendering of the separate view 300 is tied to the rendering of the summary view 200 (FIG. 2) such that the separate view 300 is, at some point, superimposed over at least a part of the summary view 200. In various embodiments, the superimposed separate view 300 may displace a portion of the summary view 200, which may move or shift accordingly.

The separate view 300 provides additional information about the item result 212 (FIG. 2) from the summary view 200. The separate view 300 may include an item title 303, an item price 306, an item description 309, a size selector 312, a color selector 315, and/or other information and/or option selectors. It is noted that although the item title 303 matches the item title 248 (FIG. 2) and the item price 306 matches the item price 266 (FIG. 2), the item title 303 and item price 306 may differ from those rendered in the summary view 200. As a non-limiting example, the item title 248 in the summary view 200 may be truncated or abbreviated to save screen space, while the item title 303 in the separate view 300 may be shown in its entirety. As another non-limiting example, the item price 266 in the summary view 200 may be limited to one type of the item, while the item price 306 in the separate view 300 may show prices for different options or quantities associated with the particular item.

It is understood that what is shown as part of a separate view 300 for an item may depend on characteristics of the item. For example, the size selector 312 and color selector 315 may be appropriate for clothing but not for an electronics item. Further, an electronics item may include, for example, technical specifications within the separate view 300.

The separate view 300 may include an item image 318 prominently rendered within the separate view 300. The item image 318 may be the same image as the item image 230 (FIG. 2) rendered within the summary view 200 or a different image. When the item image 318 is the same image as the item image 230, the separate view applet 136 may load the item image 318 from the data cache 139 (FIG. 1). In some embodiments, the item image 318 in the separate view 300 may be rendered with a different (e.g., greater) size or resolution than the corresponding item image 230 of the summary view 200.

Additionally, the separate view 300 may make the item image 318 selectable from several item images 321, 324. As shown, item images 321, 324 may be thumbnail images that, when selected, replace the item image 318. The selected item image 321 corresponds to the depicted item image 318 of FIG. 3. The selected item image 321 may be surrounded by a border (as shown), highlighted, or otherwise emphasized. When a user selects the alternate item image 324, the alternate item image 324 may replace the item image 318 within the separate view 300. Alternatively, the alternate item image 324 may be shown in a separate window or different location when selected. Although two thumbnail item images 321, 324 are illustrated in FIG. 3, it is understood that any number of such item images 321, 324 may be provided within a separate view 300. The number of such item images 321, 324 may depend on the particular item being examined.

The size selector 312, color selector 315, and/or other option selectors may be configured to interact with the item image 318 in order to show a variation in the item based on the option selector. For example, the item image 318 may have been rendered based on the color of the selected color selector 327. In various embodiments, the separate view applet 136 may be configured to generate a replacement item image 318 on demand based at least in part on one or more option selectors.

In various embodiments, the separate view 300 may provide a plurality of similar items 330 according to the item result 212 being examined. The similar items 330 may be selected by the electronic commerce application 115 (FIG. 1), based, for example, on item data 118 (FIG. 1), order data 124 (FIG. 1), page view data 127 (FIG. 1), and/or other data. In some embodiments, the similar items 330 may be predefined for the item being examined. As illustrated, the similar items 330 may be rendered as thumbnail images of items along with a similar items label 333. The similar items label 333 states: "Related Items." In other embodiments, the similar items label 333 may state, for example, "Similar Items," "Customers who viewed this item also viewed," "Customers who viewed this item ultimately purchased," etc.

Similar items 330 that have been viewed by customers who also viewed the item being examined may be helpful to users who may want to browse through many types of similar items 330 in categories such as, for example, apparel. Similar items 330 may relate to items that were ultimately purchased by customers who viewed the particular item. Such similar items 330 may be helpful to users who are doing research to find the best particular item to buy in an item category such as, for example, electronics. Similar items 330 may comprise alternate items, accessory items, recommended items, etc. Other types of similar items 330 may be provided.

The similar items 330 may comprise links wherein selecting (e.g., clicking on, hovering over, etc.) the image or representation of the similar item 330 may load the similar item 330 for examination within the separate view 300. Alternatively, the similar item 330 may be loaded for examination within the window of the summary view 200 or within another window of the browser 133. When the similar item 330 is loaded for examination within the separate view 300, a different pool of items may be loaded for serial examination within the separate view 300.

The separate view 300 may also include several links and/or buttons used to perform an action relative to the item being examined. To this end, the separate view 300 may include an add to cart link 336, an add to list link 339, a details link 342, and/or other links. The add to cart link 336, when selected, may add the item result 212 to a shopping cart list associated with the user. Additionally, the add to cart link 336 may facilitate the ordering of the item result 212 according to any options selected or entered within the separate view 300. The add to list link 339, when selected, may add the item result 212 to a user list, e.g., a wish list, a gift list, and/or any other type of list of items that may be stored in user list data 121 (FIG. 1).

The details link 342, when selected, may be configured to launch a detailed view for the item result 212. Such a detailed view may be rendered in the same browser 133 window as the summary view 200, the separate view 300, or some other browser 133 window. Such a detailed view may include information and/or input fields in addition to those depicted in the separate view 300 for the particular item result 212.

Additionally, the separate view 300 may include information and tools at the top of the window to facilitate serial examination of the pool of items in ranked priority order. A label 345 shows that the item result 212 being examined in the separate view 300 is the first item from of a pool of 212 items. Toggle tools 348, 351 provide an interface for a serial movement, i.e., the switching of items from the pool of items for serial examination. A close button 354 may also be provided in order to close the separate view 300 and return, for example, to the summary view 200.

Toggle tools 348, 351 may comprise links, buttons, images, and/or other user interface elements. Toggle tool 348, when selected, causes a previous item of the pool of items to be examined within the separate view 300. The previous item may be associated with a higher priority than the item being examined. Toggle tool 351, when selected, causes a next item of the pool of items to be examined within the separate view 300. The next item may be associated with a lower priority than the item being examined.

In various embodiments, the toggle tools 348, 351 may be selected through a keyboard, voice recognition, and/or other data input techniques. In one embodiment, when no previous item or next item is available in the pool of items, the toggle tools 348, 351 may cause the separate view 300 to cycle to the last item or the first item of the pool of items, respectively. In another embodiment, when no previous item or next item is available in the pool of items, the toggle tools 348, 351 may not be selectable and may, for example, be grayed out. In one embodiment, the toggle tool 348, 351 may be selectable so as to enable an automatic sequential rendering of item results from the pool of items, with each item being rendered for a time period.

When a toggle tool 348, 351 is selected, the separate view applet 136 may preliminarily update the separate view 300 with data loaded from the data cache 139. As a non-limiting example, the separate view applet 136 may have data relating to the next or previous item result from a DOM previously sent to the browser 133. Where the item image 318 is cached, the separate view 300 may be rendered, for example, with the item image 318 while the data related to the other features is downloaded from the electronic commerce application 115.

When the separate view 300 is updated for an item not displayed in the corresponding summary view 200, the separate view applet 136 may cause the summary view 200 to be updated for a next portion of the pool of items. The next portion of the pool of items may be sequenced after or before the portion of the pool of items originally rendered in the summary view 200.

In some embodiments, the separate view applet 136 may prefetch data for items from the pool of items that may be subsequently examined by the user. As a non-limiting example, when a user has loaded an item for examination, the separate view applet 136 may prefetch data for the next several items from the pool of items in order to speed rendering of the next several items during serial examination. Such prefetched data may be cached in the data cache 139.

Figure 4:
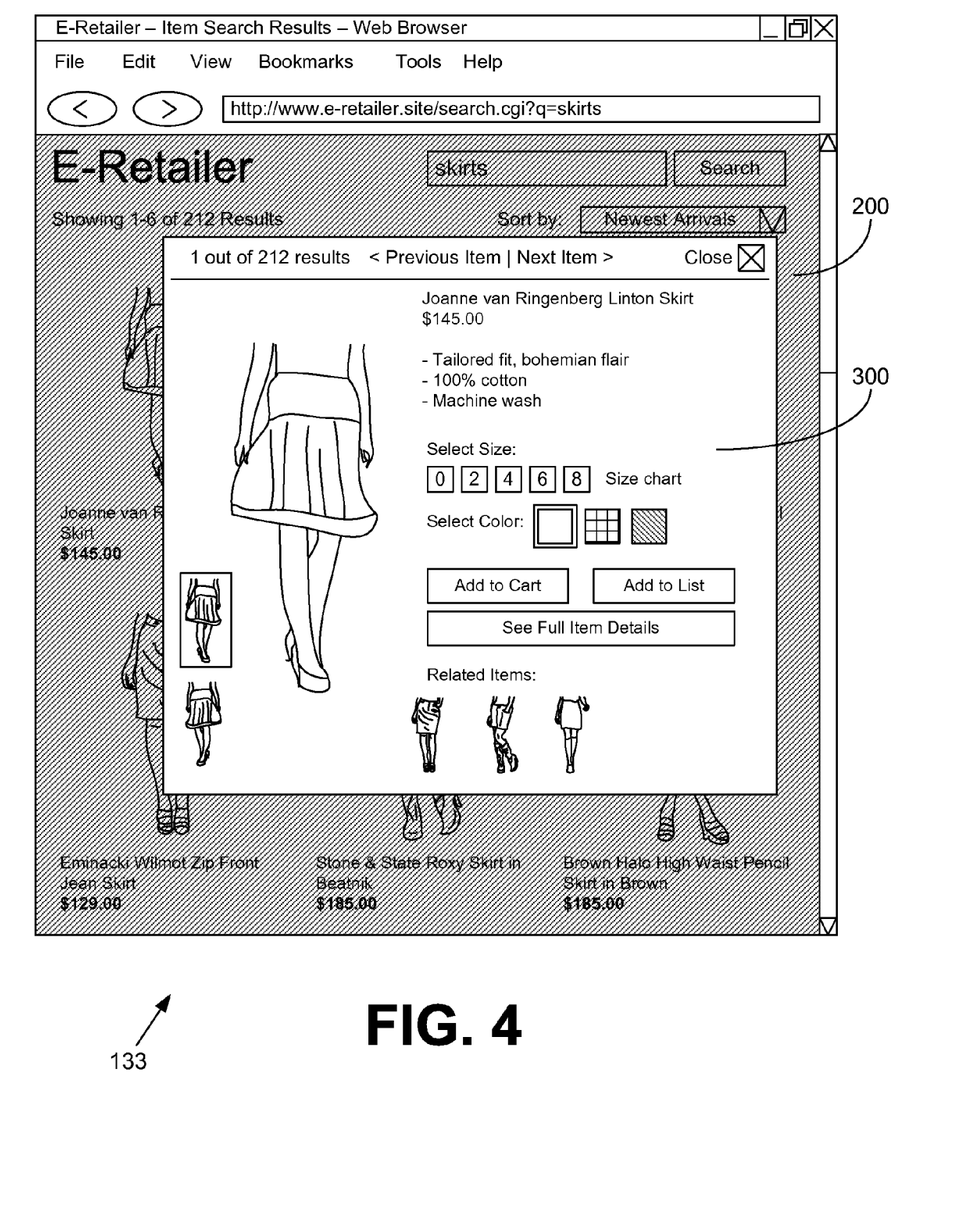

Referring next to FIG. 4, shown is a drawing of an example of a user interface rendered by a client 106 (FIG. 1) in the networked environment 100 (FIG. 1) according to various embodiments of the present disclosure. In particular, FIG. 4 depicts an example of a browser 133 rendering a separate view 300 (FIG. 3) superimposed over a summary view 200 (FIG. 2). In this non-limiting example, the separate view 300 is rendered as a pop-over window. The summary view 200 is shown deemphasized relative to the separate view 300. In this non-limiting example, summary view 200 is shown dimmed, shadowed, or grayed, but other forms of relative emphasis may be used.

Figure 5:
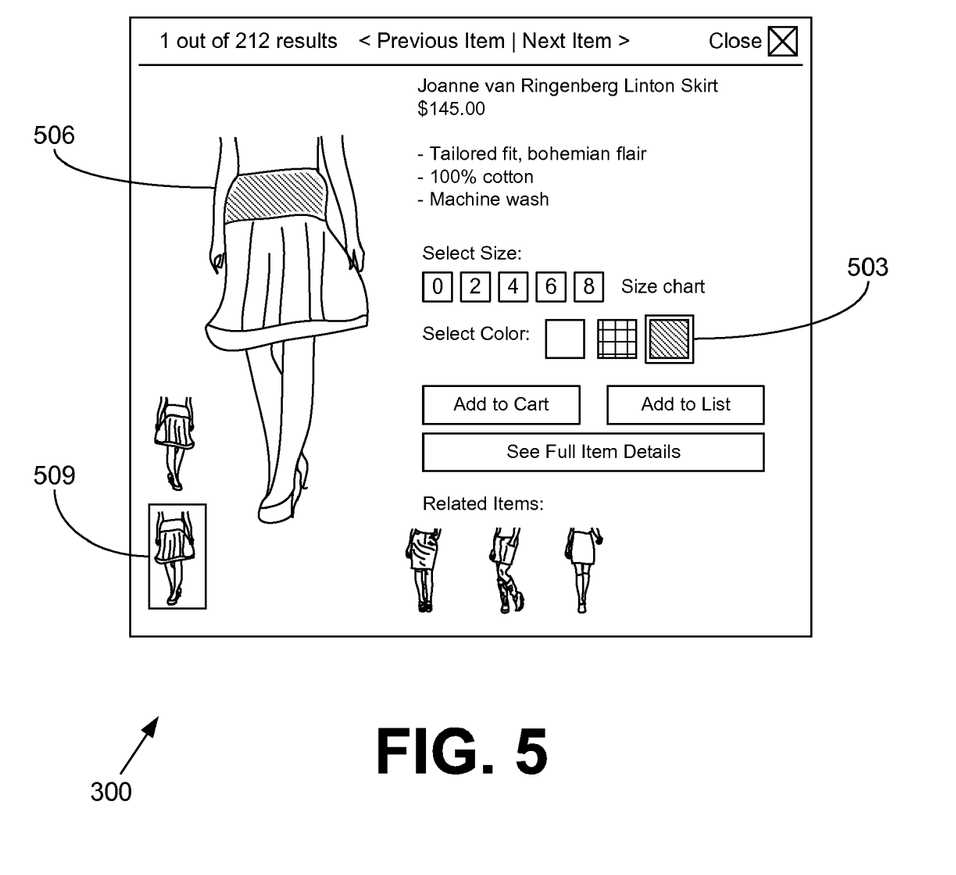

Turning now to FIG. 5, shown is a drawing of an example of a user interface rendered by a client 106 (FIG. 1) in the networked environment 100 (FIG. 1) according to various embodiments of the present disclosure. In particular, FIG. 5 depicts an example of a separate view 300 rendered by a browser 133 (FIG. 1) executing on the client 106. In FIG. 5, a different color selector 503 is selected, corresponding to a different item color than in FIG. 3, and the item image 506 is altered relative to item image 318 (FIG. 3) to depict the different item color. Moreover, a different thumbnail item image 509 is selected, and item image 506 corresponds to the thumbnail item image 509. The separate view 300 may be updated by the separate view applet 136 (FIG. 1) in response to user interaction. Such updating may involve requesting additional data from the electronic commerce application 115 (FIG. 1) and/or may involve loading data stored in the data cache 139 (FIG. 1). Data that is downloaded may be stored in the data cache 139 for faster rendering.

Figure 6:
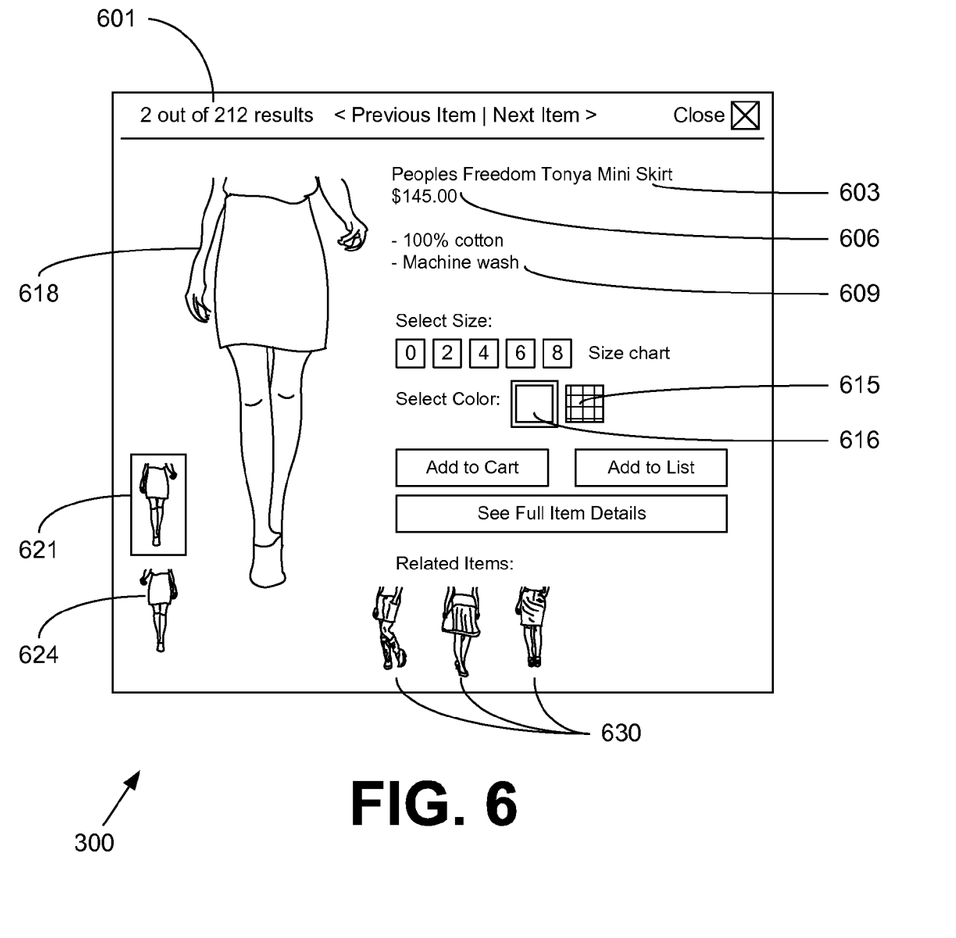

Moving next to FIG. 6, shown is a drawing of an example of a user interface rendered by a client 106 (FIG. 1) in the networked environment 100 (FIG. 1) according to various embodiments of the present disclosure. In particular, FIG. 6 depicts an example of a separate view 300 rendered by a browser 133 (FIG. 1) executing on the client 106. In FIG. 6, the separate view 300 has been updated for a next item result 215 (FIG. 2) in the pool of items. To this end, separate view 300 includes a label 601 that is changed from label 345 (FIG. 3) to indicate that the current item result 215 being examined is the second result out of 212 results. Additionally, item title 603, item price 606, item description 609, color selector 615, selected color selector 616, and other features have been updated for the item result 215.

Further, a different item image 618 is rendered, along with different thumbnail item images 621, 624. Thumbnail item image 621 is shown as selecting the item image 618 that is prominently displayed. Because the item result 215 has changed from the item result 212 (FIG. 2), a different plurality of similar items 630 is provided.

Figure 7:
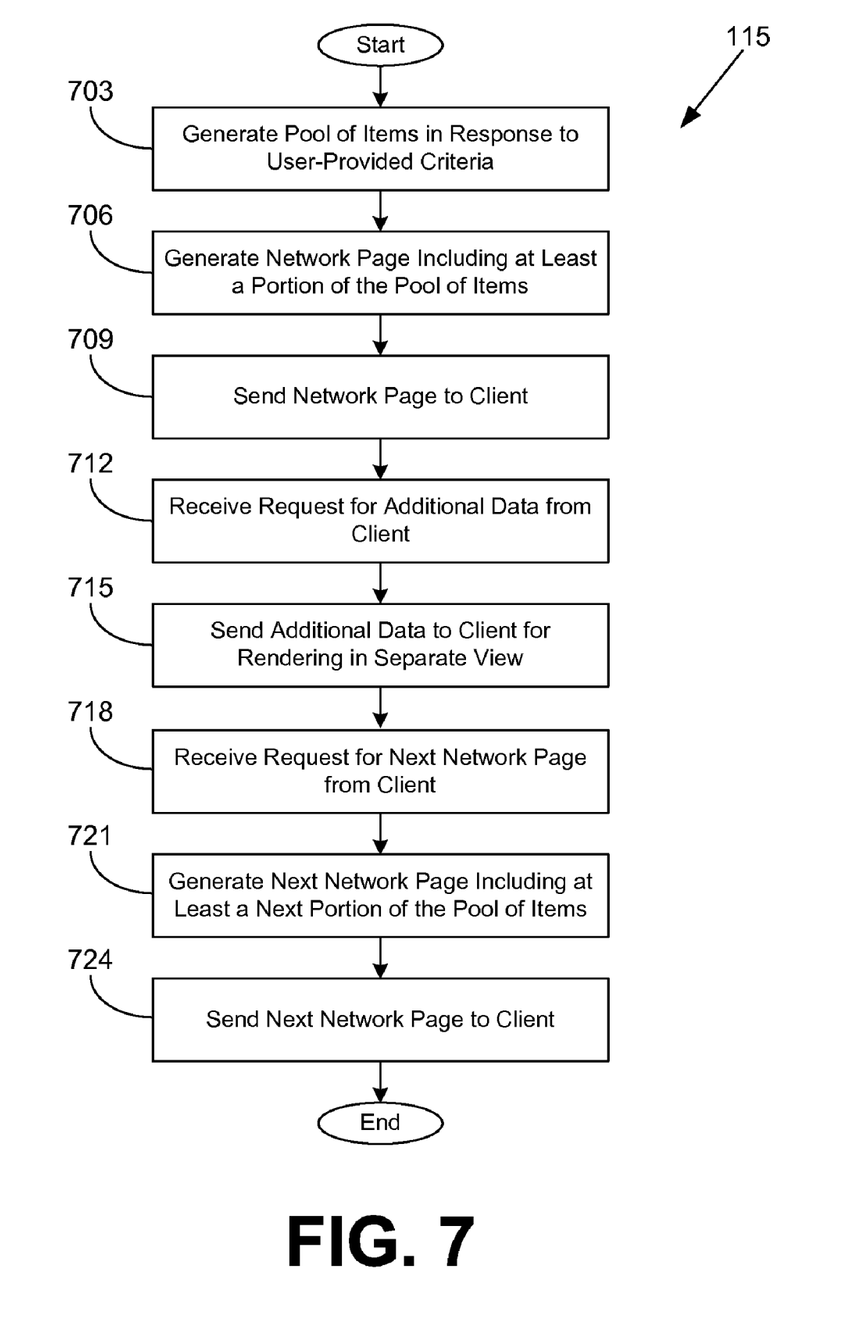
FIG. 7 is a flowchart illustrating one example of functionality implemented as portions of an electronic commerce application executed in a computing resource in the networked environment of FIG. 1 according to various embodiments of the present disclosure.

Referring next to FIG. 7, shown is a flowchart that provides one example of the operation of a portion of the electronic commerce application 115 according to various embodiments. It is understood that the flowchart of FIG. 7 provides merely an example of the many different types of functional arrangements that may be employed to implement the operation of the portion of the electronic commerce application 115 as described herein. As an alternative, the flowchart of FIG. 7 may be viewed as depicting an example of steps of a method implemented in the computing resource 103 (FIG. 1) according to one or more embodiments.

Beginning with box 703, the electronic commerce application 115 generates a pool of items, which may be in response to user-provided selection criteria such as a search query, a category, and/or other criteria. In other embodiments, the electronic commerce application 115 may generate the pool of items based on other criteria that are not provided by users. The pool of items is generated by the electronic commerce application 115 in a sequenced order according to a priority of the respective items. The type of sequencing of the pool of items may be determined by a user-supplied parameter or may be determined according to a default sequencing. The type of sequencing may include, for example, newest arrivals, best selling, most relevant, etc.

In box 706, the electronic commerce application 115 generates one or more network pages including at least a portion of the pool of items. The network page(s) implement a summary view 200 (FIG. 2) of the portion of the pool of items. How many of the items from the pool of items are included within the portion may depend on pagination parameters associated with the computing resource 103 or the client 106 (FIG. 1) in particular. The network page may include information about the entire pool of items, for example, within a data structure such as a DOM. The network page may also implement an applet or other client-side code (such as the separate view applet 136 (FIG. 1)) that provides a separate view 300 (FIG. 3) for examination of one item from the pool of items. In box 709, the network page (or network pages) is sent to the client 106.

Next, in box 712, the electronic commerce application 115 may receive a request for additional data from the client 106. As a non-limiting example, a user may have initiated rendering of a separate view 300 of a particular item result 218 (FIG. 2), and the separate view applet 136 may in turn request any additional data that would be necessary to render the features for the separate view 300. The additional data may be loaded from the item data 118 (FIG. 1) or other data within the data store 112 (FIG. 1). In box 715, the electronic commerce application 115 sends the additional data to the client 106.

In box 718, the electronic commerce application 115 may receive a request for a next network page from the client 106. As a non-limiting example, the client 106 may be rendering a summary view 200 of the first portion of the pool of items when the user navigates to an item in another portion of the pool of items. As another non-limiting example, the client 106 may be rendering a separate view 300 for a particular item when the user serially moves to another item not within the corresponding summary view 200, thereby triggering an update of the summary view 200 for a next portion of a pool of items.

In box 721, the electronic commerce application 115 generates a next network page (or network pages) including at least a next portion of the pool of items. Then, in box 724, the electronic commerce application 115 sends the next network page(s) to the client 106. It is understood that the tasks of boxes 712-724 may be repeated any number of times according to user interaction at the client 106. Thereafter, the electronic commerce application 115 ends.

Figure 8:
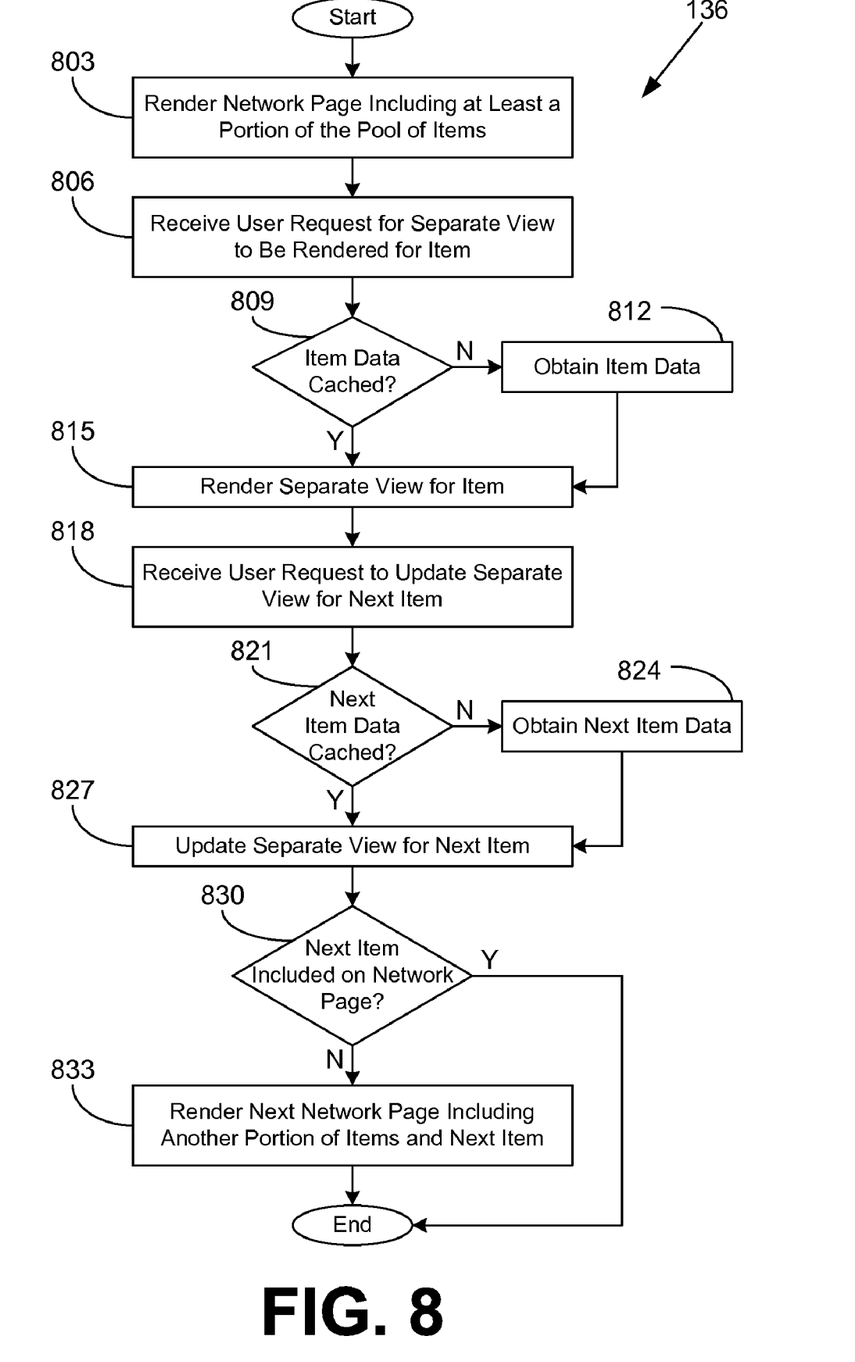
FIGS. 8-9 are flowcharts illustrating examples of functionality implemented within a browser executed in a client in the networked environment of FIG. 1 according to various embodiments of the present disclosure.

Turning now to FIG. 8, shown is a flowchart that provides one example of the operation of a portion of the separate view applet 136 according to various embodiments. It is understood that the flowchart of FIG. 8 provides merely an example of the many different types of functional arrangements that may be employed to implement the operation of the portion of the separate view applet 136 as described herein. As an alternative, the flowchart of FIG. 8 may be viewed as depicting an example of steps of a method implemented in the client 106 (FIG. 1) according to one or more embodiments.

Beginning with box 803, the separate view applet 136 renders a network page including at least a portion of the pool of items generated by the electronic commerce application 115 (FIG. 1). The network page may be a summary view 200 (FIG. 2). Next, in box 806, the separate view applet 136 receives a user request for a separate view 300 (FIG. 3) to be rendered for an item. A user may, for example, hover over a particular item result 218 (FIG. 2) and select a function to launch the separate view 300 for the particular item result 218.

In box 809, the separate view applet 136 determines whether data relating to the item result 218 has been cached, for example, in data cache 139 (FIG. 1). If the data has not been cached, the separate view applet 136 moves to box 812 and obtains the data for the item result 218 from the electronic commerce application 115 executing on the computing resource 103 (FIG. 1). Thereafter, the separate view applet 136 moves to box 815. If the separate view applet 136 determines that the data has been cached, the cached data may be used and the separate view applet 136 also moves to box 815.

In box 815, the separate view applet 136 renders the separate view 300 for the item result 218. The separate view 300 may be rendered, for example, as an auxiliary window superimposed over a part of the summary view 200. To this end, the summary view 200 may be deemphasized relative to the separate view 300.

Next, in box 818, the separate view applet 136 receives a user request to update the separate view 300 for a next item result 221 (FIG. 2). It is understood that the user request may instead be to update the separate view 300 for a previous item result 215 (FIG. 2). The user request may be initiated, for example, through a toggle tool 348, 351 (FIG. 3). In box 821, the separate view applet 136 determines whether data relating to the next item result 221 has been cached. If the data has not been cached, the separate view applet 136 moves to box 824 and obtains the data relating to the next item result 221 from the electronic commerce application 115 executing on the computing resource 103.

Thereafter, the separate view applet 136 moves to box 827. If the separate view applet 136 determines in box 821 that the data has been cached, the cached data may be used and the separate view applet 136 also moves to box 827.

In box 827, the separate view applet 136 updates, or renders, the separate view 300 for the next item result 221. Then, in box 830, the separate view applet 136 determines whether the next item result 221 is included within the network page providing the summary view 200. If the separate view applet 136 determines that the next item result 221 is included within the summary view 200, the separate view applet 136 ends. Otherwise, the separate view applet 136 moves to box 833 and renders a next network page including another portion of the pool of items, where the another portion of the pool of items includes the next item result 221. To this end, the separate view applet 136 may download the next network page from the electronic commerce application 115 or may render the next network page from cached data. Thereafter, the separate view applet 136 ends.

Figure 9:
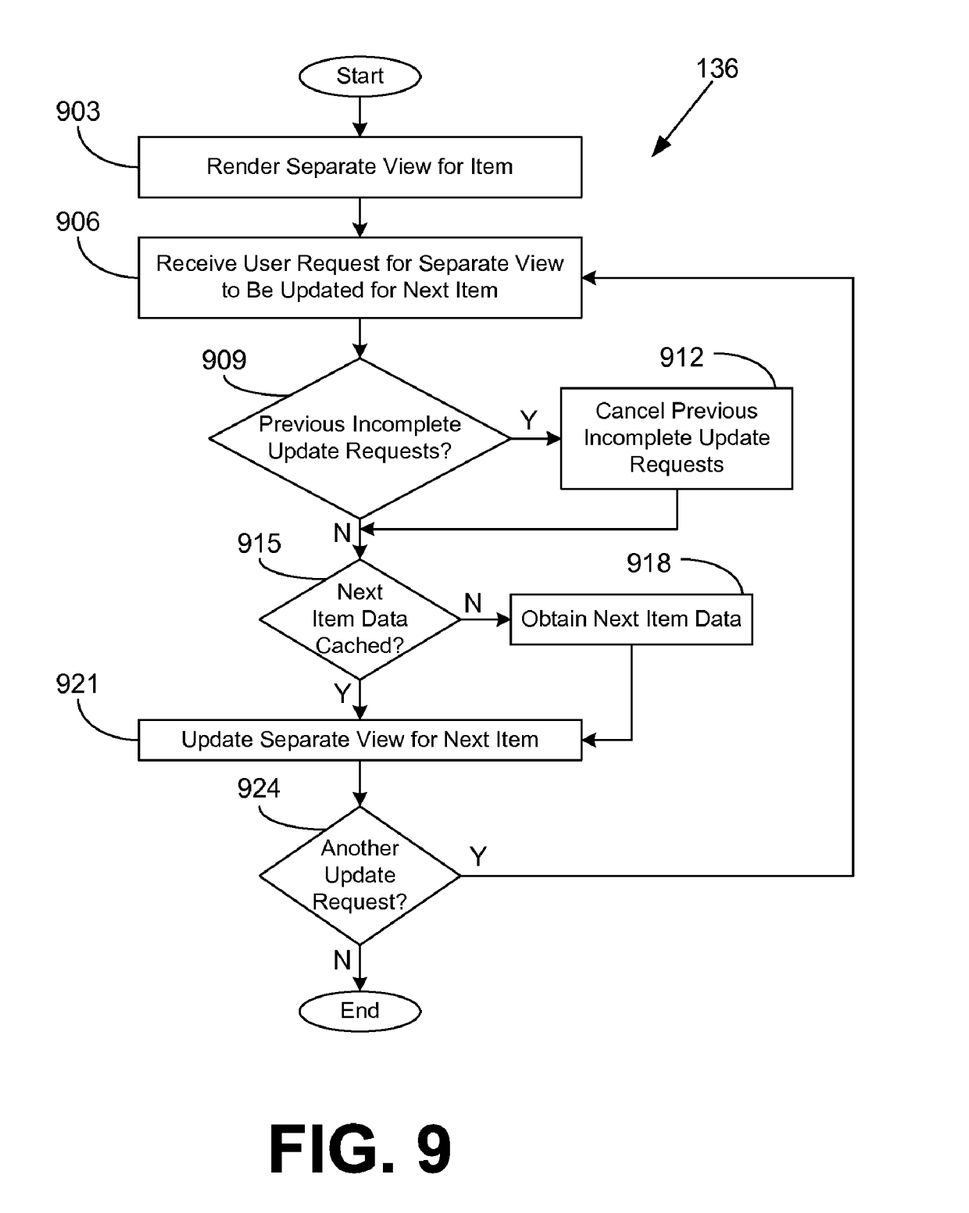

Turning now to FIG. 9, shown is a flowchart that provides another example of the operation of a portion of the separate view applet 136 according to various embodiments. It is understood that the flowchart of FIG. 9 provides merely an example of the many different types of functional arrangements that may be employed to implement the operation of the portion of the separate view applet 136 as described herein. As an alternative, the flowchart of FIG. 9 may be viewed as depicting an example of steps of a method implemented in the client 106 (FIG. 1) according to one or more embodiments.

Beginning with box 903, the separate view applet 136 renders a separate view 300 (FIG. 3) for an item. Then, in box 906, the separate view applet 136 receives a user request for the separate view 300 to be updated for a next item from the pool of items. For example, the user may select a toggle tool 348, 351 (FIG. 3). It is understood that the same functionality may also be applied to a request for an update for a previous item from the pool of items.

In box 909, the separate view applet 136 determines whether there are previous incomplete update requests still pending. If so, the separate view applet 136 moves to box 912 and cancels the previous incomplete update requests. Thereafter, the separate view applet 136 proceeds to box 915. If the separate view applet 136 determines in box 909 that no previous incomplete update requests are pending, the separate view applet 136 also proceeds to box 915.

In box 915, the separate view applet 136 determines whether data relating to the next item is cached, for example, in data cache 139 (FIG. 1). If the data is not cached, the separate view applet 136 proceeds to box 918 and obtains data relating to the next item from the electronic commerce application 115 (FIG. 1). Thereafter, the separate view applet 136 proceeds to box 921. If the data is cached, the separate view applet 136 uses the cached data and also proceeds to box 921.

In box 921, the separate view 300 is updated for the next item. Next, in box 924, the separate view applet 136 determines whether another update request has been issued. If another update request has been issued, the separate view applet 136 returns to box 906 and receives the user request for the separate view 300 to be updated for another next item in the pool of items and proceeds from there. If another update request has not been issued, the separate view applet 136 ends.

Figure 10:
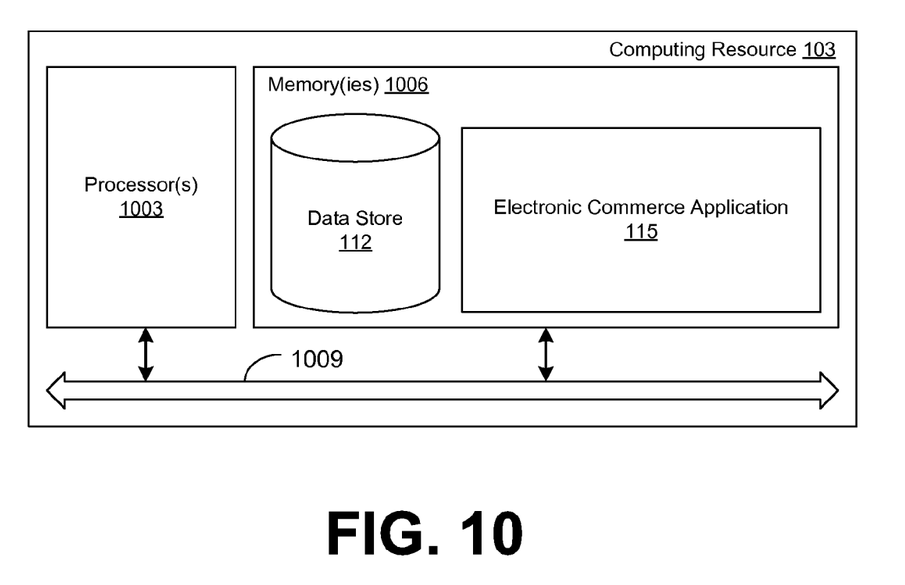
FIG. 10 is a schematic block diagram that provides one example illustration of a computing resource employed in the networked environment of FIG. 1 according to various embodiments of the present disclosure.

With reference to FIG. 10, shown is a schematic block diagram of the computing resource 103 according to an embodiment of the present disclosure. The computing resource 103 includes at least one processor circuit, for example, having a processor 1003 and a memory 1006, both of which are coupled to a local interface 1009. To this end, the computing resource 103 may comprise, for example, at least one server computer or like device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 are the electronic commerce application 115 and potentially other applications. Also stored in the memory 1006 may be a data store 112 and other data. In addition, an operating system may be stored in the memory 1006 and executable by the processor 1003.

Figure 11:
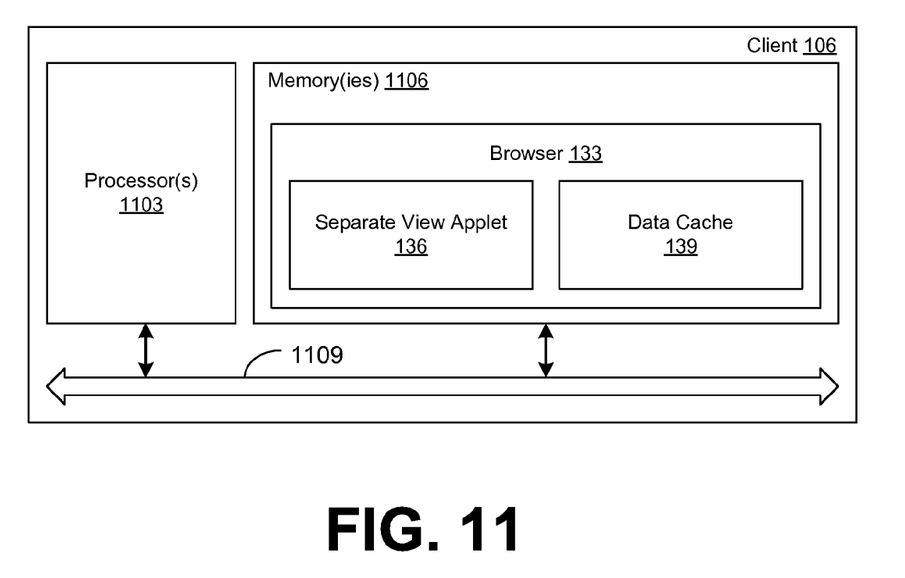
FIG. 11 is a schematic block diagram that provides one example illustration of a client employed in the networked environment of FIG. 1 according to various embodiments of the present disclosure.

With reference to FIG. 11, shown is a schematic block diagram of the client 106 according to an embodiment of the present disclosure. The client 106 includes at least one processor circuit, for example, having a processor 1103 and a memory 1106, both of which are coupled to a local interface 1109. The local interface 1109 may comprise, for example, a data bus with an accompanying address/control bus or other bus structure as can be appreciated.

Stored in the memory 1106 are both data and several components that are executable by the processor 1103. In particular, stored in the memory 1106 and executable by the processor 1103 are the browser 133, including the separate view applet 136, the data cache 139, and potentially other applications. In addition, an operating system may be stored in the memory 1106 and executable by the processor 1103.

Referring now to both FIGS. 10 and 11, it is understood that there may be other applications that are stored in the memories 1006, 1106 and are executable by the processors 1003, 1103 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memories 1006, 1106 and are executable by the processors 1003, 1103. In this respect, the term "executable" means a program file that is in a form that can ultimately be run by the processors 1003, 1103. Examples of executable programs may be, for example, a compiled program that can be translated into machine code in a format that can be loaded into a random access portion of the memories 1006, 1106 and run by the processors 1003, 1103, source code that may be expressed in proper format such as object code that is capable of being loaded into a random access portion of the memories 1006, 1106 and executed by the processors 1003, 1103, or source code that may be interpreted by another executable program to generate instructions in a random access portion of the memories 1006, 1106 to be executed by the processors 1003, 1103, etc. An executable program may be stored in any portion or component of the memories 1006, 1106 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 1006, 1106 are defined herein as including both volatile and nonvolatile memory and data storage components. Volatile components are those that do not retain data values upon loss of power. Nonvolatile components are those that retain data upon a loss of power. Thus, the memories 1006, 1106 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors 1003, 1103 may represent multiple processors 1003, 1103 and the memories 1006, 1106 may represent multiple memories 1006, 1106 that operate in parallel processing circuits, respectively. In such a case, the local interfaces 1009, 1109 may be an appropriate network 109 (FIG. 1) that facilitates communication between any two of the multiple processors 1003, 1103, between any processors 1003, 1103 and any of the memories 1006, 1106, or between any two of the memories 1006, 1106, etc. The local interfaces 1009, 1109 may comprise additional systems designed to coordinate this communication, including, for example, performing load balancing. The processors 1003, 1103 may be of electrical or of some other available construction.

Although the electronic commerce application 115, the browser 133, the separate view applet 136, the data cache 139, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 7-9 show the functionality and operation of an implementation of portions of the electronic commerce application 115 and the separate view applet 136. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as processors 1003, 1103 in a computer system or other system. The machine code may be converted from the source code, etc. If embodied in hardware, each block may represent a circuit or a number of interconnected circuits to implement the specified logical function(s).

Although the flowcharts of FIGS. 7-9 show a specific order of execution, it is understood that the order of execution may differ from that which is depicted. For example, the order of execution of two or more blocks may be scrambled relative to the order shown. Also, two or more blocks shown in succession in FIGS. 7-9 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 115, the browser 133, the separate view applet 136, and the data cache 139, that comprises software or code can be embodied in any computer-readable medium for use by or in connection with an instruction execution system such as, for example, a processors 1003, 1103 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium storing a program executable in a computing resource, the program comprising:
    code that generates a pool of products, the pool of products being selected from a catalog of products according to at least one product selection criterion provided by a user, the pool of products being sequentially ordered;
    code that encodes for rendering a network page including a summary view of at least a portion of the pool of products, the network page implementing an applet, the applet being configured to render a pop-over window superimposed over at least a portion of the summary view, the pop-over window providing a separate view for examination of one product from the pool of products, the pop-over window facilitating a serial examination of the pool of products, the pop-over window being rendered for examination of a first product in response to a selection of the first product within the summary view by the user, the applet being configured to update the summary view for a next portion of the pool of products when a product in the next portion of the pool of products is examined in the separate view, the next portion of the pool of products being sequentially ordered after the portion of the pool of products within the pool of products, wherein the applet is configured to update the separate view for examination of a next product from the pool of products automatically after a time period; and
    code that sends the network page to a client.

2. The non-transitory computer-readable medium of claim 1, wherein a description of the pool of products is embodied within a document object model of the network page.

3. The non-transitory computer-readable medium of claim 1, wherein the separate view comprises another network page.

4. A method, comprising the step of:
    encoding, in a computing device, a network page for rendering by a client computing device, the network page providing a summary view of at least a portion of a pool of items, the network page including code for rendering a window superimposed over at least a portion of the summary view, the window providing a separate view for examination of one item from the pool of items, the window facilitating a serial examination of the pool of items, the code for rendering being configured to update the separate view for examination of a next item from the pool of items automatically after a time period.

5. The method of claim 4, wherein the separate view includes information about the item being examined that is additional to information about the item included within the summary view.

6. The method of claim 4, wherein the separate view includes means for adding the item being examined to a list of items associated with a user.

7. The method of claim 4, wherein the window is a pop-over window.

8. The method of claim 4, wherein the window is configured to be rendered by the client computing device in response to a selection of the item in the summary view by a user.

9. The method of claim 4, wherein the network page includes a link to initiate rendering of the window for examination of the item.

10. The method of claim 9, wherein the link is configured to be rendered by the client computing device in response to a user hovering a cursor over the item in the summary view.

11. The method of claim 4, wherein the summary view is configured to be deemphasized relative to the separate view when the window is superimposed over the summary view.

12. The method of claim 4, wherein the separate view includes a plurality of images of the item being examined, one of the images being rendered prominently within the separate view.

13. The method of claim 12, wherein the code is configured to render another one of the images of the item in place of the one of the images of the item in response to a selection of the another one of the images of the item by a user.

14. The method of claim 4, further comprising the step of sending data to the client computing device about the item being examined within the window, the data being sent separately from an image being rendered by the client computing device within the window.

15. The method of claim 4, wherein the separate view includes a list of items that are determined to be similar to the item being examined within the window.

16. The method of claim 4, wherein the window includes at least one toggle interface to facilitate a serial movement within the pool of items.

17. The method of claim 4, further comprising the step of generating, in the computing resource, the pool of items.

18. The method of claim 4, wherein the pool of items is predefined.

19. A system, comprising:
    a computing device; and
    an electronic commerce application executable in the computing device, the electronic commerce application comprising:
        logic that generates a pool of items; and logic that encodes a network page for rendering by a client, the network page providing a summary view of at least a portion of the pool of items, the network page including code for rendering an auxiliary window superimposed over at least a portion of the summary view, the auxiliary window providing a separate view for examination of one item from the pool of items, the auxiliary window facilitating serial examination of the pool of items, the code for rendering being configured to update the separate view for examination of a next item from the pool of items automatically after a time period.

20. The system of claim 19, wherein the electronic commerce application further comprises logic that obtains at least one item selection criterion from a client, wherein the pool of items is generated from a catalog of items according to the at least one item selection criterion.

21. The system of claim 19, wherein the separate view provides a link to a detail network page providing further details about the item being examined in the separate view.

22. The system of claim 19, wherein the separate view provides a link to a next item in the pool of items and a link to a previous item in the pool of items, the previous item having a higher priority than the item being examined in the separate view, the next item having a lower priority than the item being examined in the separate view.

23. The system of claim 19, wherein the pool of items is sequenced.

24. The system of claim 19, wherein the code is configured to update the summary view for a next portion of the pool of items when an item in the next portion of the pool of items is examined in the separate view, the next portion of the pool of items being sequenced after the portion of the pool of items within the pool of items.

25. A method, comprising the steps of:
  rendering, in a client computing device, a network page providing a summary view of at least a portion of a pool of items;
  rendering, in the client computing device, a window superimposed over at least a portion of the summary view, the window providing a separate view for examination of one item from the pool of items, the window facilitating a serial examination of the pool of items; and
  automatically updating, in the client computing device, the separate view for examination of a next item from the pool of items after a time period.

26. The method of claim 25, further comprising the steps of:
  obtaining, in the client computing device, at least one item image from a computing resource;
  rendering, in the client computing device, the at least one item image within the summary view;
  storing, in the client computing device, the at least one item image within a cache; and
  rendering, in the client computing device, the at least one item image within the separate view, the at least one item image being loaded from the cache.

* * * * *